United States Patent
Hori (10) Patent No.: US 8,041,205 B2
(45) Date of Patent: Oct. 18, 2011

(54) ELECTRONIC CAMERA

(75) Inventor: Takahiro Hori, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 0 days.

(21) Appl. No.: 12/754,208

(22) Filed: Apr. 5, 2010

(65) Prior Publication Data

US 2010/0254691 A1 Oct. 7, 2010

(30) Foreign Application Priority Data

Apr. 7, 2009 (JP) ................. 2009-092545

(51) Int. Cl.
*G03B 3/10* (2006.01)
*G03B 13/34* (2006.01)
*G03B 7/00* (2006.01)

(52) U.S. Cl. ..... 396/125; 396/121; 396/213; 348/222.1; 348/229.1; 348/345

(58) Field of Classification Search .......... 396/125–128, 396/121, 213; 348/222.1, 229.1, 345
See application file for complete search history.

(56) References Cited

U.S. PATENT DOCUMENTS

2008/0136959 A1 6/2008 Sasaki
2009/0059025 A1* 3/2009 Tsujino et al. ............ 348/222.1

FOREIGN PATENT DOCUMENTS

| JP | 10-213843 A | 8/1998 |
|---|---|---|
| JP | 11-249006 A | 9/1999 |
| JP | 2002-277725 A | 9/2002 |
| JP | 2003-262788 A | 9/2003 |
| JP | 2004-029105 A | 1/2004 |
| JP | 2004-289870 A | 10/2004 |
| JP | 2005-189634 A | 7/2005 |
| JP | 2006-243101 A | 9/2006 |
| JP | 2008-145760 A | 6/2008 |

* cited by examiner

*Primary Examiner* — Rochelle-Ann J Blackman
(74) *Attorney, Agent, or Firm* — Westerman, Hattori, Daniels & Adrian, LLP (57) ABSTRACT

An electronic camera includes an imaging device. The imaging device includes an imaging surface capturing an object scene through a focus lens, and produces an object scene image in a designated cycle. When a shutter button is half-depressed, an adjuster adjusts a position of the focus lens based on the object scene image produced by the imaging device. Also, a determiner determines whether or not both an illuminance and a contrast of the object scene captured by the imaging surface fall below a reference in association with a position adjusting process of the focus lens, and a controller sets a length of the designated cycle when a determination result is affirmative to be longer than that of the designated cycle when the determination result is negative.

10 Claims, 9 Drawing Sheets

TBL1

| Y(1,1) | Y(1,2) | Y(1,3) | ... | Y(16,16) |
|---|---|---|---|---|
|  |  |  | ... |  |
| AF(1,1) | AF(1,2) | AF(1,3) | ... | AF(16,16) |
|  |  |  | ... |  |

FIG.7

(A) Vsync: 1/60sec→1/30sec (B) Vsync: 1/60sec→1/15sec

ELECTRONIC CAMERA

CROSS REFERENCE OF RELATED APPLICATION

The disclosure of Japanese Patent Application No. 2009-92545, which was filed on Apr. 7, 2009, is incorporated herein by reference.

BACKGROUND OF THE INVENTION

1. Field of the Invention

The present invention relates to an electronic camera. More specifically, the present invention relates to an electronic camera which adjusts a distance from a focus lens to an imaging surface to a distance corresponding to a focal point.

2. Description of the Related Art

According to one example of a camera of this type, when an illuminance of an object scene is low, an imaging cycle of an imager is extended, and a detection cycle of a high-frequency component of an object scene image outputted from the imager is also extended. Thus, even under a low illuminace, it is possible to exactly control a focus by using a hill-climbing AF system.

However, the above-described camera has a problem in that due to the extension of the detection cycle of the high-frequency component, it requires a time period for a focal adjustment under the low illuminance.

SUMMARY OF THE INVENTION

An electronic camera according to the present invention, comprises: an imager having an imaging surface capturing an object scene through a focus lens and producing an object scene image in a designated cycle; an adjustor which adjusts a distance from the focus lens to the imaging surface based on an object scene image produced by the imager; a determiner which determines whether or not both an illuminance and a contrast of the object scene captured by the imaging surface fall below a reference, in association with an adjusting process of the adjustor; and a controller which sets a length of the designated cycle when a determination result of the determiner is affirmative to be longer than a length of the designated cycle when the determination result of the determiner is negative.

An imaging control program product according to the present invention is an imaging control program product executed by a processor of an electronic camera including an imager having an imaging surface capturing an object scene through a focus lens and producing an object scene image in a designated cycle, and comprises: an adjusting step of adjusting a distance from the focus lens to the imaging surface based on the object scene image produced by the imager; a determining step of determining whether or not both an illuminance and a contrast of the object scene captured by the imaging surface fall below a reference, in association with an adjusting process in the adjusting step; and a controlling step of setting a length of the designated cycle when a determination result in the determining step is affirmative to be longer than a length of the designated cycle when the determination result in the determining step is negative.

An imaging controlling method according to the present invention is an imaging controlling method executed by an electronic camera provided with an imager having an imaging surface capturing an object scene through a focus lens and producing an object scene image in a designated cycle, and comprises: an adjusting step of adjusting a distance from the focus lens to the imaging surface based on the object scene image produced by the imager; a determining step of determining whether or not both an illuminance and a contrast of the object scene captured by the imaging surface fall below a reference, in association with an adjusting process in the adjusting step; and a controlling step of setting a length of the designated cycle when a determination result in the determining step is affirmative to be longer than a length of the designated cycle when the determination result in the determining step is negative.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
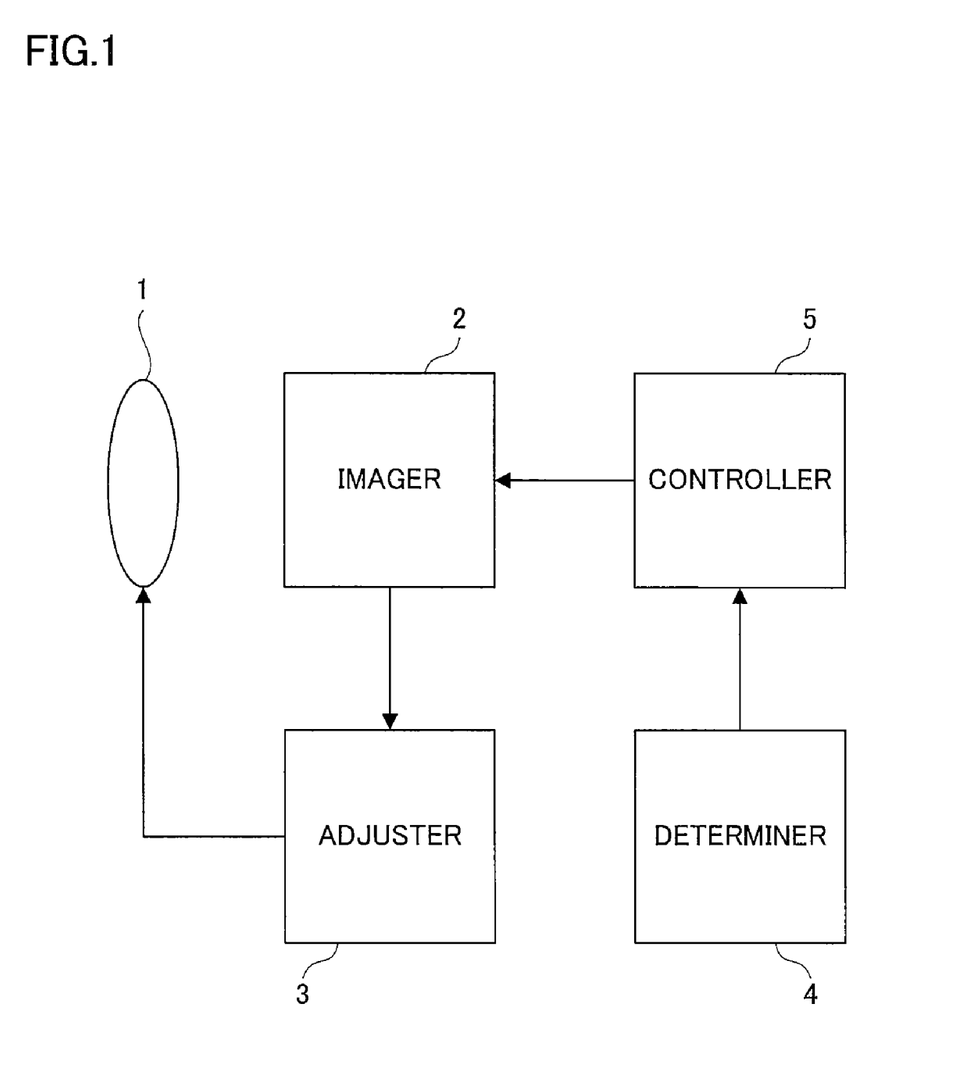
FIG. 1 is a block diagram showing a basic configuration of the present invention.

With reference to FIG. 1, an electronic camera according to the present invention is basically configured as follows: An imager 2 includes an imaging surface capturing an object scene through a focus lens 1, and produces an object scene image in a designated cycle. An adjustor 3 adjusts a distance from the focus lens 1 to the imaging surface based on the object scene image produced by the imager 2. A determiner 4 determines, in association with an adjusting process of the adjustor 3, whether or not both an illuminance and a contrast of the object scene captured by the imaging surface fall below a reference. A controller 5 sets a length of the designated cycle when a determination result of the determiner 4 is affirmative to be longer than that of the designated cycle when the determination result of the determiner 4 is negative.

Thus, upon adjustment of the length of the designated cycle, the contrast of the object scene, together with the illuminance of the object scene, is referred to. As a result, it is possible to inhibit a decrease of a focus performance under a low illuminance.

Figure 2:
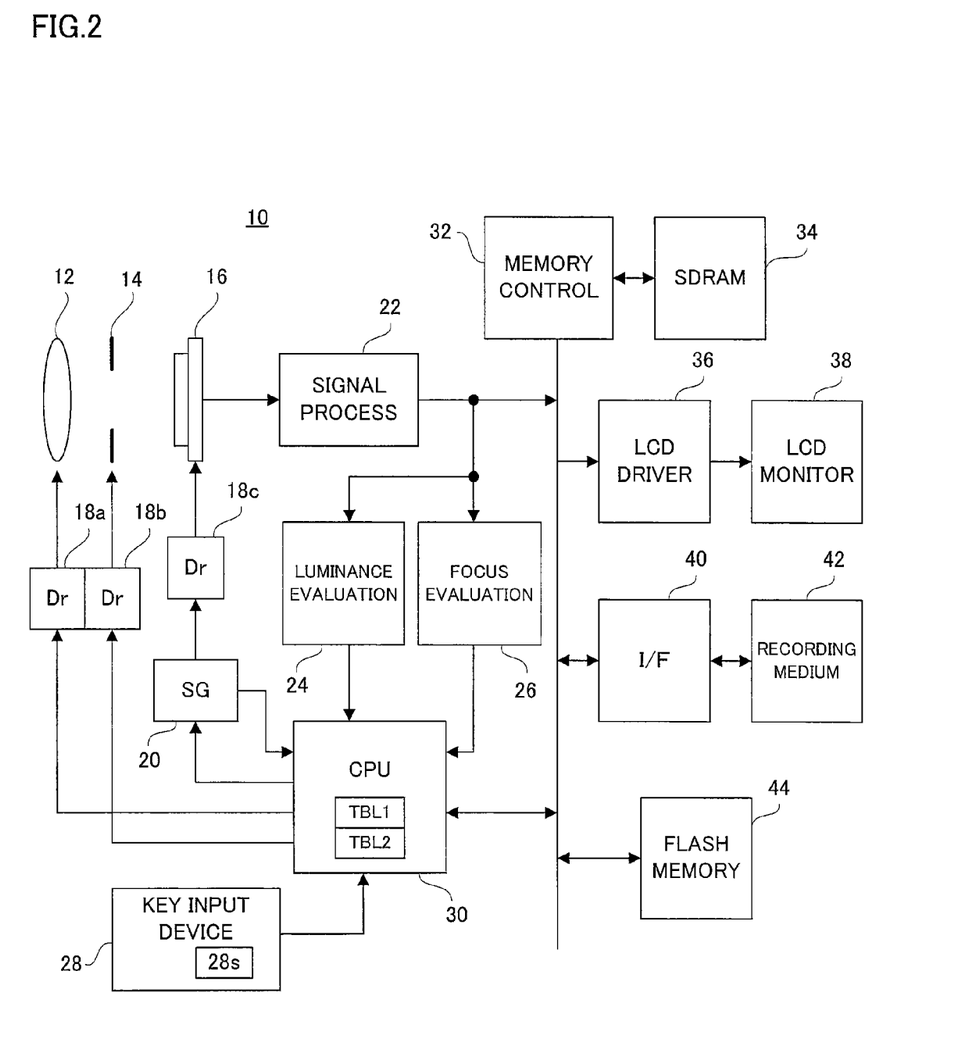
FIG. 2 is a block diagram showing a configuration of one embodiment of the present invention.

With reference to FIG. 2, a digital camera 10 according to this embodiment includes a focus lens 12 and an aperture mechanism 14 respectively driven by drivers 18a and 18b. An optical image of the object scene that undergoes the focus lens 12 and the aperture mechanism 14 enters, with irradiation, an imaging surface of an imaging device 16, and is subjected to photoelectric conversion. Thereby, electric charges representing an object scene image are produced.

When a power source is inputted, a CPU 30 sets a cycle of a vertical synchronization signal Vsync outputted from an SG (Signal Generator) 20 to 1/60 seconds. Subsequently, the CPU 30 commands a driver 18c to repeatedly perform a pre-exposure operation and a thinning-out reading-out operation in order to execute a through-image process. In response to the vertical synchronization signal Vsync outputted from the SG 20, the driver 18c performs the pre-exposure on the imaging surface and reads out a part of the electric charges produced on the imaging surface in a raster scanning manner. From the imaging device 16, low-resolution raw image data based on the read-out electric charges is repeatedly outputted at a frame rate of 60 fps.

A signal processing circuit 22 performs processes, such as white balance adjustment, color separation, and YUV conversion, on the raw image data outputted from the imaging device 16, and writes YUV formatted-image data created thereby into an SDRAM 34 through a memory control circuit 32. An LCD driver 36 repeatedly reads out the image data written into the SDRAM 34 through the memory control circuit 32, and drives an LCD monitor 38 based on the read-out image data. As a result, a real-time moving image (through image) of the object scene is displayed on a monitor screen.

Figure 3:
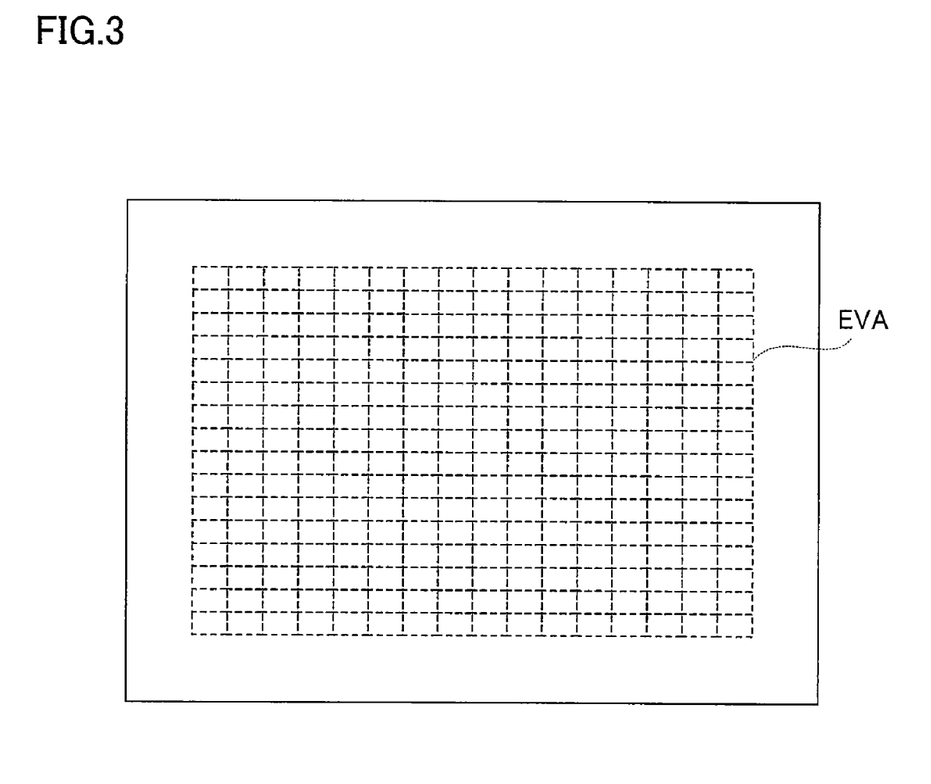
FIG. 3 is an illustrative view showing one example of an allocation state of an evaluation area in an imaging surface.

With reference to FIG. 3, an evaluation area EVA is allocated to a center of the imaging surface. The evaluation area EVA is divided into 16 parts in each of a vertical direction and a horizontal direction. That is, the evaluation area EVA is equivalent to a group of a total of 256 divided areas.

In response to the vertical synchronization signal Vsync, a luminance evaluating circuit 24 integrates Y data belonging to the evaluation area EVA, out of Y data outputted from the signal processing circuit 22, for each divided area. As a result, 256 AE evaluation values respectively corresponding to the 256 divided areas are outputted from the AE evaluating circuit 24 in response to the vertical synchronization signal Vsync.

A focus evaluating circuit 26 integrates, in response to the vertical synchronization signal Vsync, a high-frequency component of the Y data belonging to the evaluation area EVA, out of the Y data outputted from the signal processing circuit 22, for each divided area. Thereby, the 256 AF evaluation values respectively corresponding to the 256 divided areas are outputted from the focus evaluating circuit 26 in response to the vertical synchronization signal Vsync.

The CPU 30 repeatedly executes a through image-use AE process (simple AE process) in parallel with the above-described through-image process, in order to calculate an appropriate EV value based on the 256 luminance evaluation values outputted from the luminance evaluating circuit 24. An aperture amount and an exposure time period that define the calculated appropriate EV value are set to the drivers 18b and 18c, respectively. As a result, a brightness of the through image displayed on the LCD monitor 38 is moderately adjusted.

When a shutter button 28s on a key input device 28 is half-depressed, a strict recording-use AE process is executed in order to calculate an optimal EV value based on the 256 luminance evaluation values outputted from the luminance evaluating circuit 24. Similarly to the above-described case, an aperture amount and an exposure time period that define the calculated optimal EV value are set to the drivers 18b and 18c, respectively. Upon completion of the recording-use AE process, an AF process described later is executed. Thereby, the focus lens 12 is placed at a focal point.

When the shutter button 28s is fully depressed, a recording process is executed. The CPU 30 commands the driver 18c to execute a main exposure operation and all-pixel reading-out, one time each. The driver 18c performs the main exposure on the imaging surface in response to the generation of the vertical synchronization signal Vsync, and reads out all the electric charges produced in an electric-charge reading-out area in a raster scanning manner. As a result, high-resolution raw image data representing the object scene is outputted from the imaging device 16.

Outputted raw image data is subjected to a process similar to that described above, and as a result, high-resolution image data according to a YUV format is secured in the SDRAM 34. An I/F 40 reads out the high-resolution image data thus accommodated in the SDRAM 34 through the memory control circuit 32, and then, records the read-out image data on a recording medium 42 in a file format. It is noted that the through-image process is resumed at a time point when the high-resolution image data is accommodated in the SDRAM 34.

The AF process is executed as described below. Firstly, the 256 luminance evaluation values are fetched from the luminance evaluating circuit 24, and the 256 AF evaluation values are fetched from the focus evaluating circuit 26. The fetched luminance evaluation values and AF evaluation values are written on a table TBL1 shown in FIG. 4.

Figure 4:
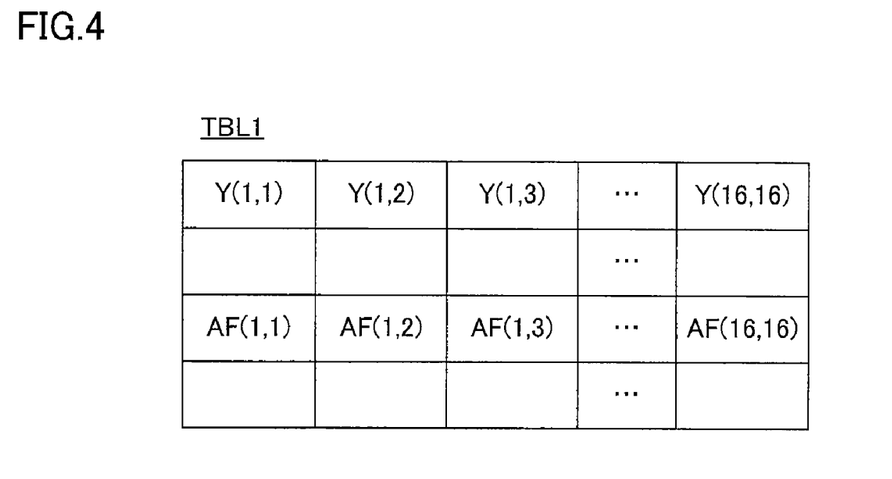
FIG. 4 is an illustrative view showing one example of a table referred to in an embodiment of FIG. 2.

Subsequently, an average of the luminance evaluation values written on the table TBL1 is calculated as an "average luminance Yave". Also, from among the AF evaluation values written on the table TBL1, a maximum AF evaluation value and a minimum AF evaluation value are specified, and a ratio of the minimum AF evaluation value relative to the maximum AF evaluation value is calculated as a "variation AFvar". Herein, the average luminance Yave is equivalent to a parameter that defines the illuminance of the object scene, and the variation AFvar is equivalent to a parameter that defines the contrast of the object scene.

Figure 5:
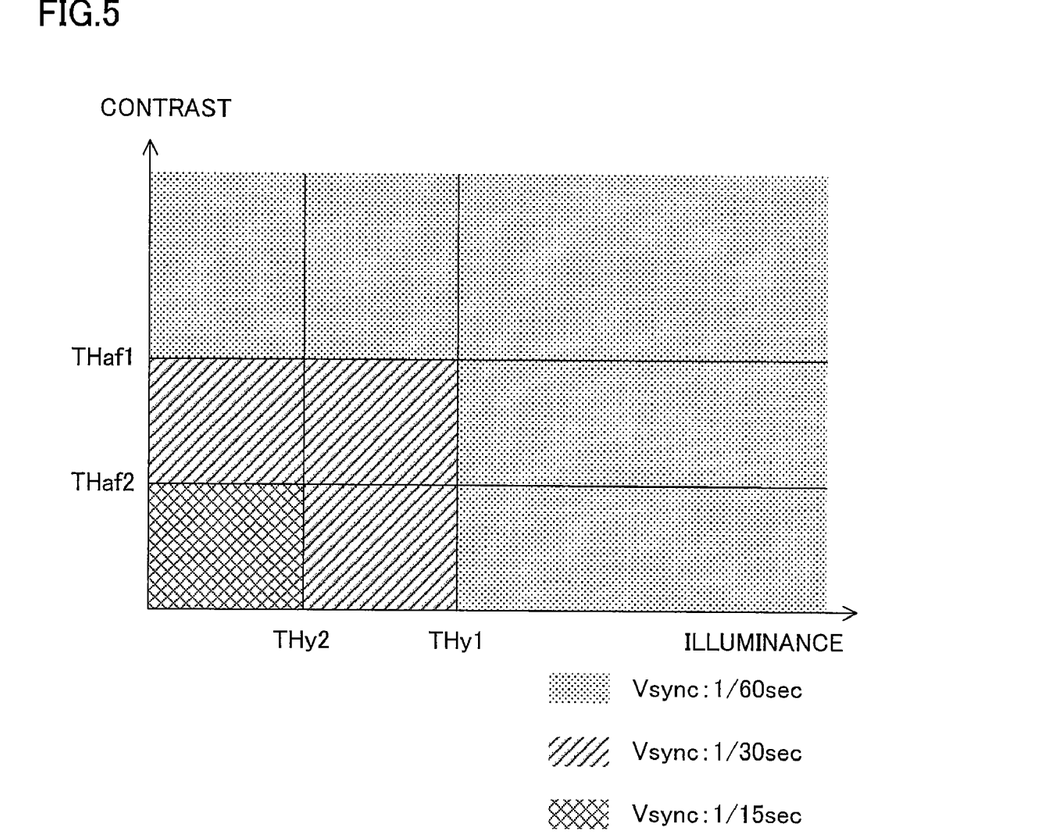
FIG. 5 is an illustrative view showing one example of a relation between: a frame rate set at a time of an AF process; and an illuminance and a contrast of an object scene.

The average luminance Yave is compared to each of reference values THy1 and THy2, and the variation AFvar is compared to each of reference values THaf1 and THaf2. As shown in FIG. 5, the reference value THy2 is smaller than the reference value THy1, and the reference value THaf2 is smaller than the reference value THaf1.

When the average luminance Yave is equal to or more than the reference value THy1 or when the variation AFvar is equal to or more than the reference value THaf1, it is regarded that at least one of the illuminance and the contrast of the object scene is sufficiently large. At this time, a generation cycle of the vertical synchronization signal Vsync is maintained at 1/60 seconds.

When the average luminance Yave and the variation AFvar fall below the reference values THy1 and THaf1, respectively, and the average luminance Yave is equal to or more than the reference value THy2 or the variation AFvar is equal to or more than the reference value THaf2, it is regarded that both the illuminance and the contrast of the object scene are insufficient. At this time, the generation cycle of the vertical synchronization signal Vsync is changed to 1/30 seconds.

When the average luminance Yave and the variation AFvar fall below the reference values THy2 and THaf2, respectively, it is regarded that both the illuminance and the contrast of the object scene are greatly insufficient. At this time, the generation cycle of the vertical synchronization signal Vsync is changed to 1/15 seconds.

Figure 6:
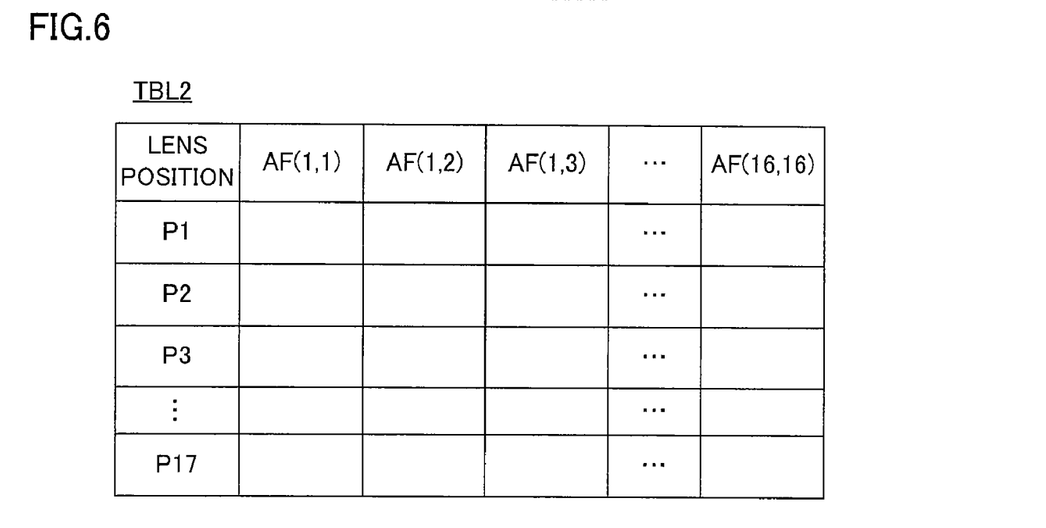
FIG. 6 is an illustrative view showing one example of a table referred to in the embodiment of FIG. 2.

After the generation cycle of the vertical synchronization signal Vsync is adjusted, the focus lens 12 is moved from a nearest end toward an infinite end by a predetermined width. The AF evaluation value outputted from the focus evaluating circuit 26 in response to the vertical synchronization signal Vsync is written, corresponding to a current position of the focus lens 12, on a table TBL2 shown in FIG. 6. The focal point is searched based on the writing on the table TBL2, and the focus lens 12 is placed at the discovered focal point. The generation cycle of the vertical synchronization signal Vsync is returned to 1/60 seconds after the focus lens 12 is placed at the focal point.

Figure 7:
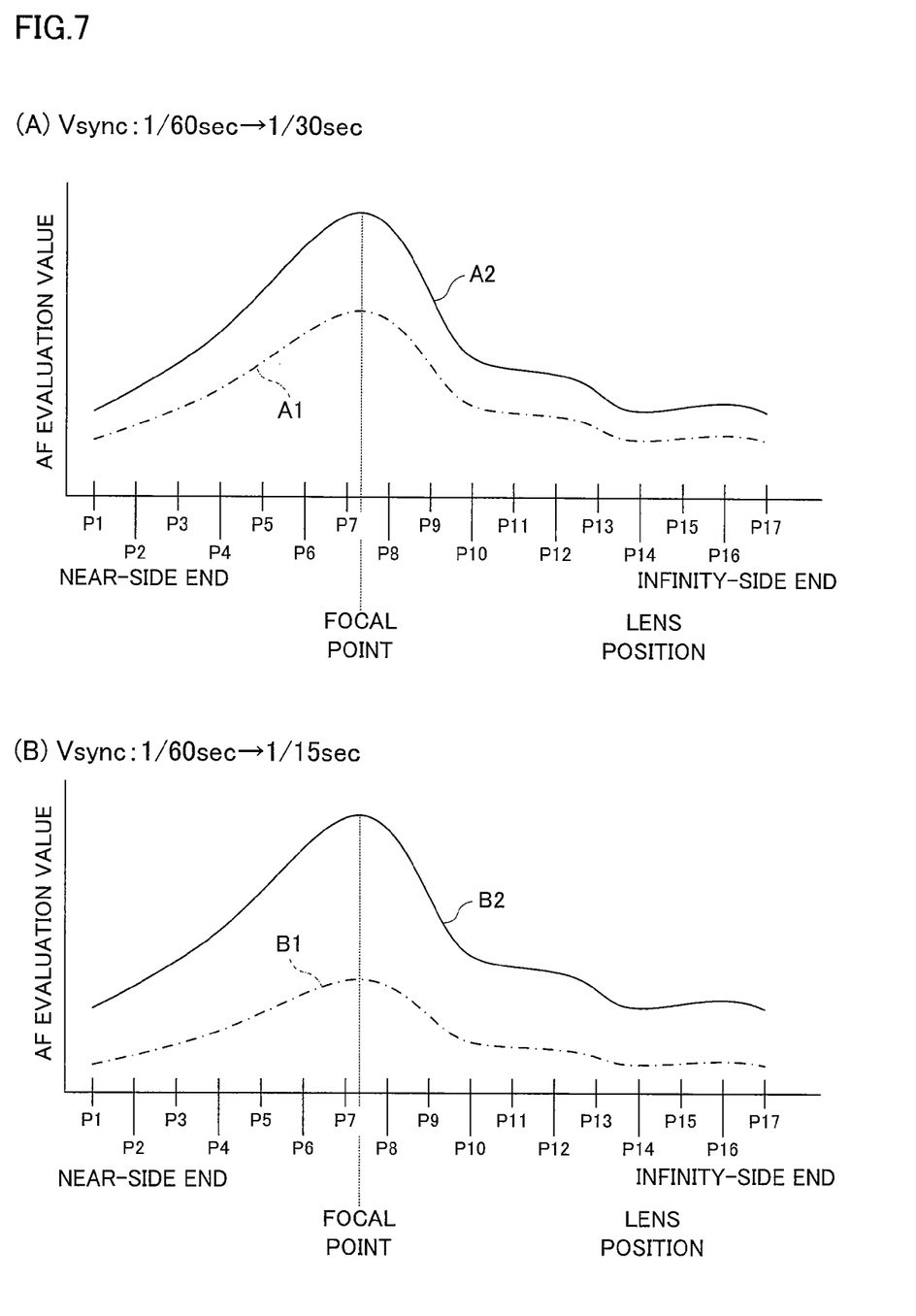
FIG. 7(A) is a graph showing one example of a relation between a position of a focus lens and an AF evaluation value.
FIG. 7(B) is a graph showing another example of the relation between the position of a focus lens and the AF evaluation value.

With reference to FIG. 7(A), when the average value of the AF evaluation values detected, corresponding to the generation cycle of 1/60 seconds, at respective lens positions is changed along a curve A1, the generation cycle is changed from 1/60 seconds to 1/30 seconds. A property of the average value of the AF evaluation values is transitioned from the curve A1 to a curve A2.

With reference to FIG. 7(B), when the average value of the AF evaluation values detected, corresponding to the generation cycle of 1/60 seconds, at respective lens positions is changed along a curve B1, the generation cycle is changed from 1/60 seconds to 1/15 seconds. A property of the average value of the AF evaluation values is transitioned from the curve B1 to a curve B2.

The CPU 30 executes a process according to an imaging task shown in FIG. 8 to FIG. 11. A control program corresponding to the imaging task is stored in a flash memory 44.

Figure 8:
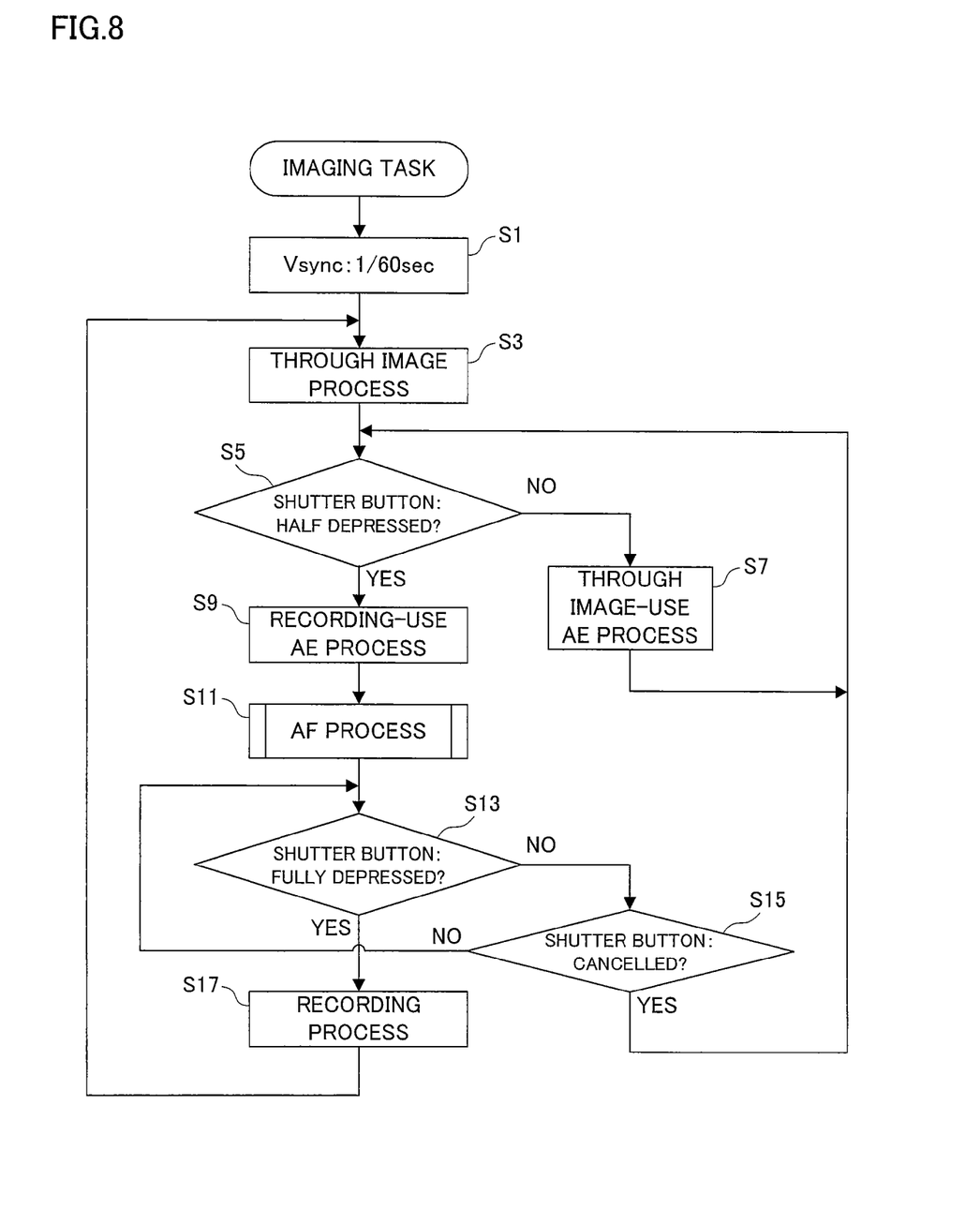
FIG. 8 is a flowchart showing one portion of an operation of a CPU applied to the embodiment in FIG. 2.

With reference to FIG. 8, the generation cycle of the vertical synchronization signal Vsync is set to 1/60 seconds in a step S1, and a through-image process is executed in a step S3. As a result, the raw image data representing the object scene is outputted from the imaging device 16 at a frame rate of 60 fps, and the through image based on the raw image data is displayed on the LCD monitor 38.

In a step S5, it is determined whether or not the shutter button 28s is half-depressed, and as long as a determination result indicates NO, the through image-use AE process in a step S7 is repeated. As a result, the brightness of the through image is adjusted moderately. When the shutter button 28s is half-depressed, the recording-use AE process is executed in a step S9, and the AF process is executed in a step S11. By the process in the step S9, the brightness of the through image is strictly adjusted, and by the process in the step S11, the focus lens 12 is placed at the focal point.

In a step S13, it is determined whether or not the shutter button 28s is fully depressed, and in a step S15, it is determined whether or not the operation of the shutter button 28s is cancelled. When YES is determined in the step S13, the process returns to the step S3 after undergoing a recording process in a step S17. When YES is determined in the step S15, the process returns to the step S5 as it is.

Figure 9:
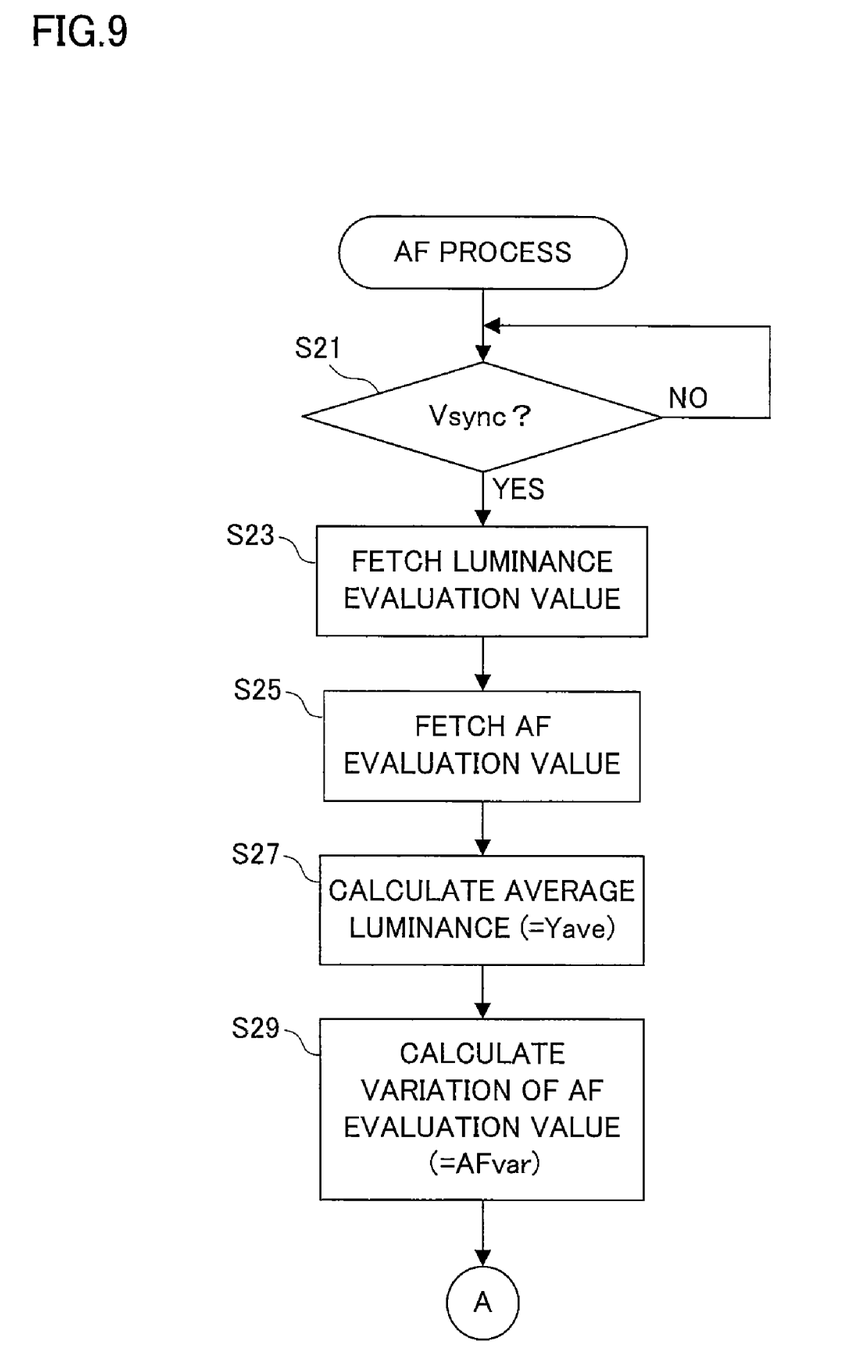
FIG. 9 is a flowchart showing another portion of the operation of the CPU applied to the embodiment in FIG. 2.
Figure 10:
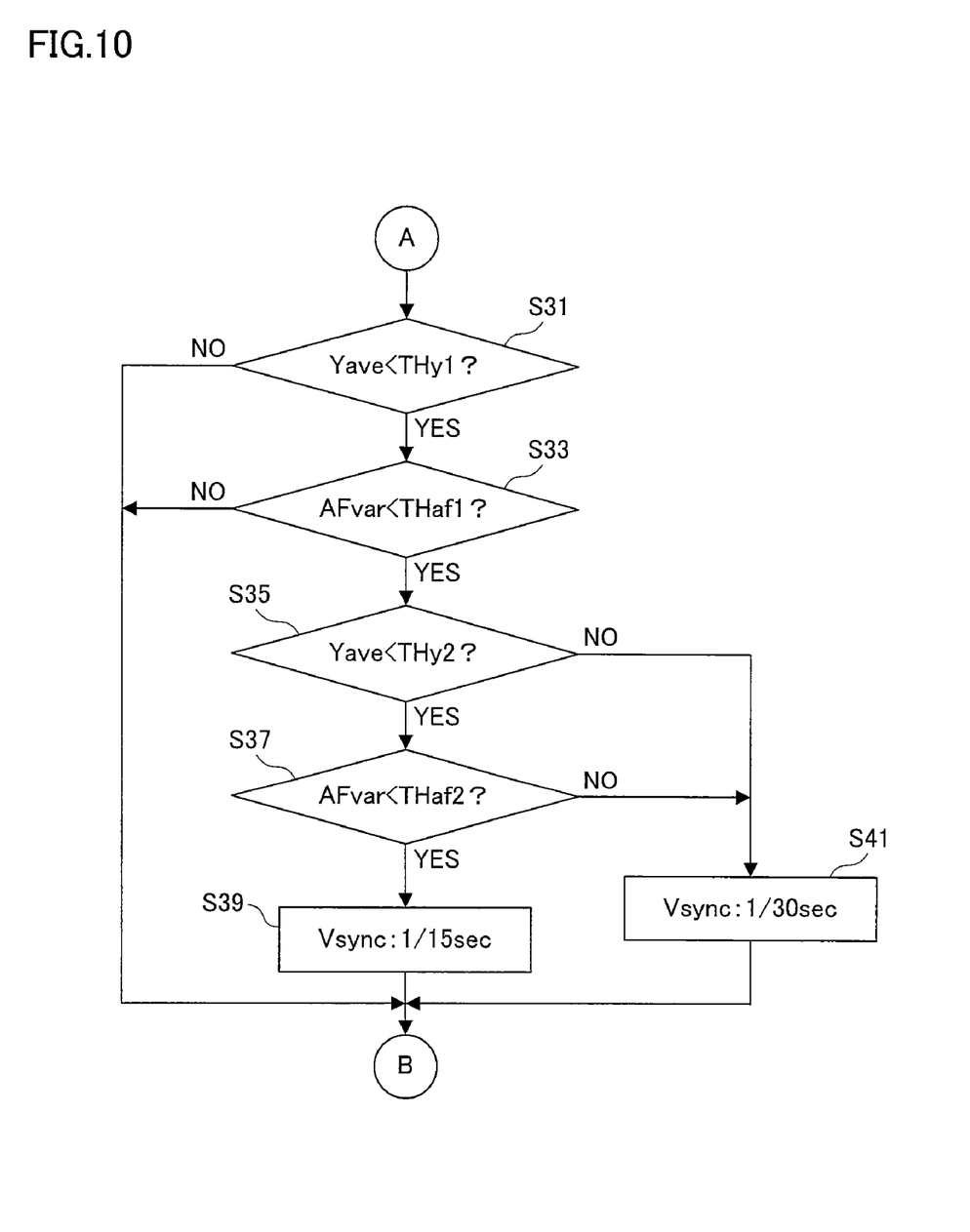
FIG. 10 is a flowchart showing still another portion of the operation of the CPU applied to the embodiment in FIG. 2.
Figure 11:
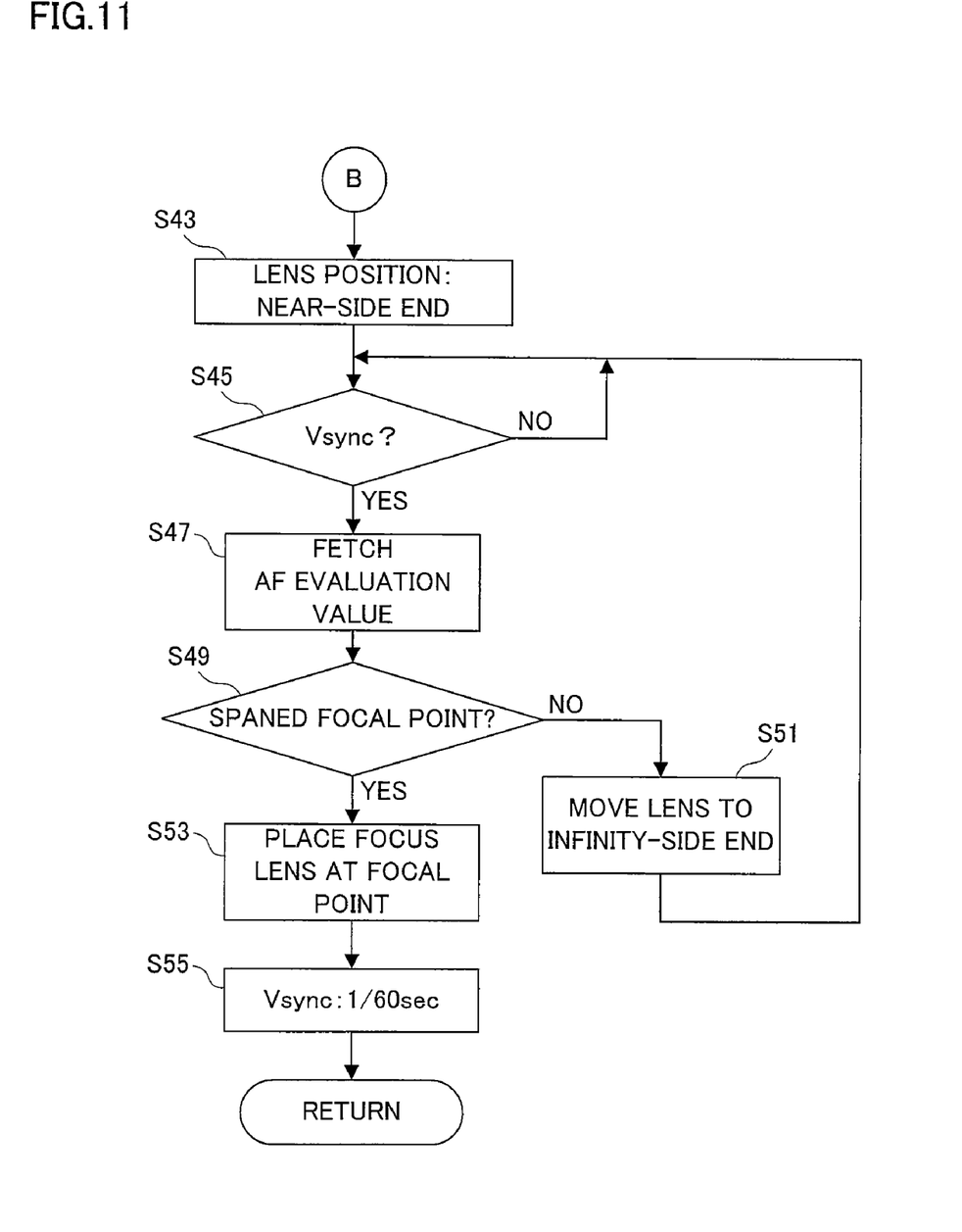
FIG. 11 is a flowchart showing yet still another portion of the operation of the CPU applied to the embodiment in FIG. 2.

The AF process in the step S11 is executed according to a sub-routine shown in FIG. 9 to FIG. 11. Firstly, in a step S21, it is determined whether or not the vertical synchronization signal Vsync is generated. When a determination result is updated from NO to YES, the 256 luminance evaluation values are fetched from the luminance evaluating circuit 24 in a step S23, and the 256 AF evaluation values are fetched from the focus evaluating circuit 26 in a step S25. The fetched luminance evaluation values and the AF evaluation values are written on the table TBL1.

In a step S27, the average of the 256 luminance evaluation values written on the table TBL1 is calculated as the "average luminance Yave". In a step S29, from among the 256 AF evaluation values written on the table TBL1, the maximum AF evaluation value and the minimum AF evaluation value are specified, and the ratio of the minimum evaluation value relative to the maximum AF evaluation value is calculated as the "variation AFvar".

In a step S31, it is determined whether or not the average luminance Yave falls below the reference value THy1, and in a step S33, it is determined whether or not the variation AFvar falls below the reference value THaf1. In a step S35, it is determined whether or not the average luminance Yave falls below the reference value THy2, and in a step S37, it is determined whether or not the variation AFvar falls below the reference value THaf2.

When NO is determined in at least one of the steps S31 and the S33, the process directly advances to a step S43. When YES is determined in both the steps S31 and S33 and NO is determined in at least one of the steps S35 and S37, the generation cycle of the vertical synchronization signal Vsync is changed to 1/30 seconds in a step S41, and thereafter, the process advances to the step S43. When YES is determined in all the steps S31, S33, S35, and S37, the generation cycle of the vertical synchronization signal Vsync is changed to 1/15 seconds in a step S39, and thereafter, the process advances to the step S43.

In the step S43, the focus lens 12 is placed at the nearest end, and in a step S45, it is determined whether or not the vertical synchronization signal Vsync is generated. When a determination result is updated from NO to YES, the 256 AF evaluation values are fetched from the focus evaluating circuit 26 in a step S47. The fetched AF evaluation values are written, corresponding to the current position of the focus lens 12, on the table TBL2.

In a step S49, it is determined based on the writing on the table TBL2 whether or not the focus lens 12 strides over the focal point. When a determination result is NO, the focus lens 12 is moved to the infinite side by the predetermined width in a step S51, and thereafter, the process returns to the step S45. When the determination result is YES, the focus lens 12 is placed at the focal point in a step S53. In a step S55, the generation cycle of the vertical synchronization signal Vsync is returned to 1/60 seconds, and thereafter, the process returns to the routine at a hierarchical upper level.

As can be seen from the above-described explanation, the imaging device 16 includes the imaging surface capturing the object scene through the focus lens 12, and produces the object scene image in the designated cycle. When the shutter button 28s is half-depressed, the CPU 30 adjusts the position of the focus lens 12 based on the object scene image produced by the imaging device 16 (S43 to S53). Also, the CPU 30 determines, in association with the position adjusting process of the focus lens 12 whether or not both the illuminance and the contrast of the object scene captured by the imaging surface fall below the references (=THy1, THy2, THaf1, and THaf2) (S31, S35, S33, and S37), and the CPU 30 sets the length of the designated cycle when the determination result is affirmative to be longer than that of the designated cycle when the determination result is negative (S1, S39, and S41).

It is noted that the above-described references include two determination references different to each other (one set of THy1 and THaf1, and the other set of THy2 and THaf2). The illuminance and the contrast of the object scene are compared to each of the two determination references, and the length of the designated cycle is set to any one of three lengths (1/60 seconds, 1/30 seconds, and 1/15 seconds) different from one another.

Thus, upon adjustment of the length of the designated cycle, the contrast of the object scene, together with the illuminance of the object scene, is referred to. As a result, it is possible to inhibit a decrease in focal speed under a low illuminance.

It is noted that in this embodiment, the focus lens 12 is moved in an optical axis direction at a time of the AF process. However, instead of the focus lens 12 or together with the focus lens 12, the imaging surface may be optionally moved in the optical axis direction.

Also, in this embodiment, in order to determine whether or not the contrast of the object scene is high or low, the ratio of the minimum AF evaluation value relative to the maximum AF evaluation value is calculated. However, any index, other than the ratio of the minimum AF evaluation value relative to the maximum AF evaluation value, may be utilized as long as it is possible to determine, as a rough guide, whether or not the contrast is high or low.

Similarly, in this embodiment, the average of the luminance evaluation values is calculated in order to determine whether or not the illuminance of the object scene is high or low. However, any index other than the average of the luminance evaluation values may be utilized as long as it is possible to determine, as a rough guide, whether or not the illuminance is high or low.

Moreover, in this embodiment, the two determination references are prepared, and the length of the designated cycle is set to any one of the three lengths. However, it may be possible to prepare three or more determination references and the length of the designated cycle is set to any one of lengths of which the number is "the number of determination references +1".

It is noted that a CCD imager or a CMOS imager, for example, is available for the imaging device 16 of this embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager having an imaging surface capturing a scene through a focus lens and producing an image in a designated cycle;
    an adjustor which adjusts a distance from the focus lens to the imaging surface based on the image produced by said imager;
    a determiner which determines whether or not both an illuminance and a contrast of the scene captured by the imaging surface fall below a reference, in association with an adjusting process of said adjustor; and
    a controller which sets a length of the designated cycle when a determination result of said determiner is affirmative to be longer than a length of the designated cycle when the determination result of said determiner is negative.

2. An electronic camera according to claim 1, wherein the reference includes M determination references different from one another, said determiner compares the illuminance and the contrast to each of the M determination references, and said controller sets the length of the designated cycle to any one of N lengths different from one another, said M being an integer of equal to or more than two, and said N being M+1.

3. An electronic camera according to claim 1, further comprising:
    a first detector which detects a high-frequency component of the image produced by said imager in a manner to correspond to each of a plurality of areas assigned to the imaging surface; and
    a second detector which detects, as a parameter that defines the contrast, a variation of the high-frequency component detected by said detector among the plurality of areas.

4. An imaging control program product executed by a processor of an electronic camera including an imager having an imaging surface capturing a scene through a focus lens and producing an image in a designated cycle, comprising:
    an adjusting step of adjusting a distance from the focus lens to the imaging surface based on the image produced by said imager;
    a determining step of determining whether or not both an illuminance and a contrast of the object scene captured by the imaging surface fall below a reference, in association with an adjusting process in said adjusting step; and
    a controlling step of setting a length of the designated cycle when a determination result in said determining step is affirmative to be longer than a length of the designated cycle when the determination result in said determining step is negative.

5. An imaging controlling method executed by an electronic camera provided with an imager having an imaging surface capturing a scene through a focus lens and producing an image in a designated cycle, comprising:
    an adjusting step of adjusting a distance from the focus lens to the imaging surface based on the image produced by said imager;
    a determining step of determining whether or not both an illuminance and a contrast of the scene captured by the imaging surface fall below a reference, in association with an adjusting process in said adjusting step; and
    a controlling step of setting a length of the designated cycle when a determination result in said determining step is affirmative to be longer than a length of the designated cycle when the determination result in said determining step is negative.

6. An electronic camera, comprising:
    an imager having an imaging surface capturing a scene through a focus lens, which outputs an image in a designated cycle;
    an adjuster which adjusts a distance from the focus lens to the imaging surface based on the image outputted from said imager;
    a first setter which sets a length of the designated cycle to a first length when an illuminance of the scene captured by the imaging surface in association with an adjusting process of said adjustor is equal or greater than a first illuminance reference;
    a second setter which sets the length of the designated cycle to the first length when a contrast of the scene captured by the imaging surface in association with the adjusting process of said adjustor is equal or greater than a first contrast reference; and
    a third setter which sets the length of the designated cycle to a second length being longer than the first length when the illuminance and the contrast of the scene captured by the imaging surface in association with the adjusting process of said adjustor fall below the first illuminance reference and the first contrast reference, respectively.

7. An electronic camera according to claim 6, wherein the second length is equivalent to any one of a first time period and a second time period which is longer than the first time period, and said third setter includes a first time period setter which sets a length of the designated cycle to the first time period when the illuminance is equal or greater than a second illuminance reference which is smaller than the first illuminance reference, a second time period setter which sets the length of the designated cycle to the first length when the contrast is equal or greater than a second contrast reference which is smaller than the first contrast reference, and a third time period setter which sets the length of the designated cycle to the second time period when the illuminance and the contrast fall below the second illuminance reference and the second contrast reference, respectively.

8. An electronic camera according to claim 6, further comprising:
   a first detector which detects a high-frequency component of the image outputted from said imager in a manner to correspond to each of a plurality of areas assigned to the imaging surface; and
   a second detector which detects, as a parameter that defines the contrast, a variation of the high-frequency component detected by said detector among the plurality of areas.

9. A computer program embodied in a tangible medium which is executed by a processor of an electronic camera provided with an imager, having an imaging surface capturing a scene through a focus lens, which outputs an image in a designated cycle, the computer program, comprising:
   an adjusting instruction to adjust a distance from the focus lens to the imaging surface based on the image outputted from said imager;
   a first setting instruction to set a length of the designated cycle to a first length when an illuminance of the scene captured by the imaging surface in association with an adjusting process based on said adjusting instruction is equal or greater than an illuminance reference;
   a second setting instruction to set the length of the designated cycle to the first length when a contrast of the scene captured by the imaging surface in association with the adjusting process based on said adjusting instruction is equal or greater than a contrast reference; and
   a third setting instruction to set the length of the designated cycle to a second length being longer than the first length when the illuminance and the contrast of the scene captured by the imaging surface in association with the adjusting process based on said adjusting instruction fall below the illuminance reference and the contrast reference, respectively.

10. An imaging method executed by an electronic camera provided with an imager, having an imaging surface capturing a scene through a focus lens, which outputs an image in a designated cycle, the imaging method, comprising;
    an adjusting step of adjusting a distance from the focus lens to the imaging surface based on the image outputted from said imager;
    a first setting step of setting a length of the designated cycle to a first length when an illuminance of the scene captured by the imaging surface in association with an adjusting process of said adjusting step is equal or greater than an illuminance reference;
    a second setting step of setting the length of the designated cycle to the first length when a contrast of the scene captured by the imaging surface in association with the adjusting process of said adjusting step is equal or greater than a contrast reference; and
    a third setting step of setting the length of the designated cycle to a second length being longer than the first length when the illuminance and the contrast of the scene captured by the imaging surface in association with the adjusting process of said adjusting step fall below the illuminance reference and the contrast reference, respectively.

* * * * *